US011873585B2

(12) United States Patent
Kolmes

(10) Patent No.: US 11,873,585 B2
(45) Date of Patent: Jan. 16, 2024

(54) CONDUCTIVE YARN/SEWING THREAD CAPABLE OF DATA/SIGNAL TRANSMISSION HAVING REDUCED OR ELIMINATED CROSSTALK, COUPLED WITH ONE OR MORE DEVICES FOR SATELLITE POSITIONING AND ACCELEROMETER MEASUREMENTS IN A SMART FABRIC, AND GARMENT MADE THEREFROM

(71) Applicant: SUPREME CORPORATION, Conover, NC (US)

(72) Inventor: Matthew L Kolmes, Denver, NC (US)

(73) Assignee: SUPREME CORPORATION, Conover, NC (US)

( * ) Notice: Subject to any disclaimer, the term of this patent is extended or adjusted under 35 U.S.C. 154(b) by 1015 days.

(21) Appl. No.: 16/784,337

(22) Filed: Feb. 7, 2020

(65) Prior Publication Data

US 2020/0255984 A1 Aug. 13, 2020

Related U.S. Application Data

(60) Provisional application No. 62/802,431, filed on Feb. 7, 2019.

(51) Int. Cl.

*D02G 3/44* (2006.01)
*H01Q 1/27* (2006.01)
*A41D 1/00* (2018.01)
*H01B 1/02* (2006.01)

(52) U.S. Cl.

CPC ............ *D02G 3/441* (2013.01); *A41D 1/005* (2013.01); *H01B 1/026* (2013.01); *H01Q 1/273* (2013.01); *D10B 2401/06* (2013.01)

(58) Field of Classification Search

None

See application file for complete search history.

(56) References Cited

U.S. PATENT DOCUMENTS

| | | | | |
|---|---|---|---|---|
| 7,592,276 | B2 | 9/2009 | Hill et al. | |
| 9,330,558 | B2 | 5/2016 | Logan et al. | |
| 2010/0038112 | A1 | 2/2010 | Grether | |
| 2012/0122358 | A1 | 5/2012 | Hansbro | |
| 2017/0325518 | A1 | 11/2017 | Poupyrev et al. | |
| 2018/0014597 | A1* | 1/2018 | Cooke | A42B 3/042 |
| 2018/0087191 | A1 | 3/2018 | Threlkeld | |
| 2018/0303190 | A1* | 10/2018 | Calilung | A42B 3/185 |
| 2019/0175411 | A1* | 6/2019 | Awiszus | A61F 9/067 |

FOREIGN PATENT DOCUMENTS

WO WO 2014/041032 A1 3/2014

OTHER PUBLICATIONS

International Search Report and Written Opinion dated Jun. 5, 2020 in PCT/US 20/17146, 13 pages.

* cited by examiner

*Primary Examiner* — Wilson Lee

(74) *Attorney, Agent, or Firm* — TUCKER ELLIS, L.L.P.; J. Derek Mason

(57) ABSTRACT

A garment is provided prepared from a smart fabric, wherein the smart fabric contains:

one or more devices providing satellite positioning measurement, accelerometer measurement, or both, conductively coupled to a battery or other DC power source, and in additional embodiments, the smart fabric contains a conductive composite yarn/sewing thread, wherein the conductive composite yarn/sewing thread has:

a) a core formed of at least two strands of a conductive metal of 40 or higher gauge, wherein the at least two strands of conductive metal are configured such that one strand is wrapped around the other strand at a wrap rate of from 1 to 50 turns per inch (tpi); wherein the wrapped strand is preferably a ground wire, and b) at least one inner cover wrapped around the core in a first direction at a rate sufficient to provide substantially complete coverage of the core by the inner cover;

c) at least one outer cover wrapped around the at least one inner cover, wherein the outer cover is wrapped in a second direction opposite to a direction of a cover layer on which the outer cover is directly wrapped, at a rate sufficient to provide substantially complete cover of the cover layer on which the outer cover is directly wrapped; and d) at least one bonding agent; and e) optionally, a lubricant, and optionally further including one or more biometric sensors.

27 Claims, No Drawings

CONDUCTIVE YARN/SEWING THREAD CAPABLE OF DATA/SIGNAL TRANSMISSION HAVING REDUCED OR ELIMINATED CROSSTALK, COUPLED WITH ONE OR MORE DEVICES FOR SATELLITE POSITIONING AND ACCELEROMETER MEASUREMENTS IN A SMART FABRIC, AND GARMENT MADE THEREFROM

CROSS REFERENCE TO RELATED APPLICATIONS

The present application is related to and claims priority from U.S. Provisional Ser. No. 62/802,431, filed Feb. 7, 2019, the entire contents of which are hereby incorporated herein by reference.

The present application is related to U.S. Provisional Ser. No. 62/563,970, filed Sep. 27, 2017, and PCT application No. PCT/US2018/053083, filed Sep. 27, 2018, the entire contents of each of which are hereby incorporated by reference in their entireties.

The present application is also related to U.S. patent application Ser. No. 15/277,397, filed Sep. 27, 2016, entitled "CONDUCTIVE YARN/SEWING THREAD, SMART FABRIC, AND GARMENT MADE THEREFROM", the entire contents of which are hereby incorporated by reference in their entirety.

BACKGROUND OF THE INVENTION

Field of Invention

The present invention relates to the area of smart fabrics and smart garments having therein one or more devices having satellite positioning and/or accelerometer capabilities.

Discussion of the Background

A demand has developed for smart fabrics and smart garments, having conductive capabilities through the use of conductive yarns used in making of the fabric/garment, thus permitting the operation of electrical sensors, detectors and/or metering devices to measure and track various aspects of the wearer's well-being. Such smart fabrics and garments are particularly sought for use in military and sporting applications. In military or first responder (police/fire) uses, such smart fabrics can be used to track the wearer's biometric readings, as well as for satellite tracking of individuals in the operational theater.

Unfortunately, previous efforts in providing such conductive yarn have met with limited success. This is particularly the case where the conductive yarn is intended as a sewing thread. Sewing thread, because of the nature of its use, must be able to withstand the stresses created thereon by the many repeated bends and jerks occurring during the conventional sewing operation. Therefore it must be able to endure these bends and stresses without breaking. Since most attempts to make conductive yarn involve the use of a metallic strand as part of the yarn, and metallic strands have a tendency to succumb to such repeated bends and stresses by breaking, conductive sewing threads have been even more difficult to provide, since breaking of the conductive metallic strand results in a break in the conductivity.

Another problem with conductive sewing thread is the need to be able to sew the conductive thread across itself without causing an electrical short circuit.

There still exists a need for a conductive yarn, and particularly for a conductive sewing thread that, in addition to functioning as a yarn or sewing thread, will withstand the bends and stresses of use, particularly in sewing, while maintaining sufficiently high conductivity to provide the conductive benefits intended. In such a case the sewing thread must maintain its integrity through the sewing process, and must not result in shorting out the electrical circuit when the thread is sewn across itself.

A further issue arises when one attempts to use the conductive yarn or sewing thread to transmit signals or data, such as in smart fabrics having biometric sensors and/or satellite positioning and/or accelerometer capabilities, reporting data into a storage unit within the smart fabric itself or externally to the smart fabric. When signals or data get transmitted via such conductive yarns or sewing threads, there can be interference from ambient radiative processes and sources, or interference in the form of crosstalk between separate conductive yarns or sewing threads within the same fabric or garment which are each transmitting signals. Accordingly, there is a need for such conductive yarns or sewing threads in which the problem of crosstalk or electronic interference has been greatly reduced or even eliminated, in order to have consistent transmission of the data or signals. There is further a need for such smart fabrics/garments which can report the location and movement of the wearer in real time, along with sending alerts when the wearer is incapacitated or otherwise in distress.

SUMMARY OF THE INVENTION

Accordingly, one object of the present invention is to provide a conductive composite yarn, and particularly a conductive composite sewing thread that enables the production of conductive patterns in a fabric.

A further object of the present invention is to provide the conductive composite yarn or sewing thread which is capable of signal or data transmission, wherein by virtue of its construction, the problem of crosstalk has been reduced or eliminated.

A further object of the present invention is to provide a smart fabric made using the conductive composite yarn/sewing thread of the present invention.

A further object of the present invention is to provide a smart fabric made using the conductive composite yarn/sewing thread of the present invention, which further contains one or more devices for satellite positioning and/or accelerometer capabilities to track the position and/or movement of the wearer.

A further object of the present invention is to provide a smart garment made using the smart fabric of the present invention.

A further object of the present invention is to provide a system for identifying when the wearer of the smart garment of the present invention is in some form of distress, thus causing the smart garment to send a signal to a central location identifying the wearer and/or the wearer's location, such that assistance can be dispatched immediately.

These and other objects of the present invention have been satisfied, either individually or in combination, by the discovery of a garment prepared from a smart fabric, wherein the smart fabric comprises:

one or more devices providing satellite positioning measurement, accelerometer measurement, or both, conductively coupled to a battery or other DC power source, preferably further comprising:

a conductive composite yarn/sewing thread conductively coupled to the one or more devices providing satellite positioning measurement, accelerometer measurement, or both, wherein the conductive composite yarn/sewing thread comprises:

a) a core formed of at least two strands of a conductive metal of 40 or higher gauge, wherein the at least two strands of conductive metal are configured such that one strand is wrapped around the other strand at a wrap rate of from 1 to 50 turns per inch (tpi); wherein the wrapped strand is preferably a ground wire, and
b) at least one inner cover wrapped around the core in a first direction at a rate sufficient to provide substantially complete coverage of the core by the inner cover;
c) at least one outer cover wrapped around the at least one inner cover, wherein the outer cover is wrapped in a second direction opposite to a direction of a cover layer on which the outer cover is directly wrapped, at a rate sufficient to provide substantially complete cover of the cover layer on which the outer cover is directly wrapped; and
d) at least one bonding agent; and
e) optionally, a lubricant.

DETAILED DESCRIPTION OF THE INVENTION

The present invention relates to a garment prepared from a smart fabric, wherein the smart fabric comprises one or more devices providing satellite positioning measurement, accelerometer measurement, or both, conductively coupled to a battery or other DC power source. The garment preferably further comprises a conductive composite yarn/sewing thread, and, optionally, one or more signal transmitters conductively coupled to the one or more devices, wherein the one or more signal transmitters are capable of sending data through one or both of a mobile telephone network or a satellite communications network, wherein the conductive composite yarn comprises a central core having at least two strands of a conductive metal of 40 or higher gauge, wherein the at least two strands of conductive metal are configured such that one strand is wrapped around the other strand at a wrap rate of from 1 to 50 turns per inch, wherein the wrapped strand is preferably a ground wire; a cover of one or more strands of a synthetic or natural fiber, which may optionally be a high performance fiber, and an outer cover of a synthetic or natural fiber, such as polyester or nylon strand(s), treated with a suitable bonding agent, and, optionally, with an outer application of a suitable lubricant. The conductive composite yarn is particularly suitable for use as a sewing thread.

The term "fiber" as used herein refers to a fundamental component used in the assembly of yarns and fabrics. Generally, a fiber is a component which has a length dimension which is much greater than its diameter or width. This term includes ribbon, strip, staple, and other forms of chopped, cut or discontinuous fiber and the like having a regular or irregular cross section. "Fiber" also includes a plurality of any one of the above or a combination of the above.

As used herein, the term "high performance fiber" means that class of synthetic or natural non-glass fibers having high values of tenacity greater than 10 g/denier, such that they lend themselves for applications where high abrasion and/or cut resistance is important. Typically, high performance fibers have a very high degree of molecular orientation and crystallinity in the final fiber structure.

The term "filament" as used herein refers to a fiber of indefinite or extreme length such as found naturally in silk. This term also refers to manufactured fibers produced by, among other things, extrusion processes. Individual filaments making up a fiber may have any one of a variety of cross sections to include round, serrated or crenular, bean-shaped or others.

Within the context of the present invention, unless otherwise denoted, the terms "polyester" and "nylon" are used generically and include any of the conventional members of the polyester and nylon families of fibers, respectively. Nylon is preferably nylon-6,6. Polyester is preferably polyethylene terephthalate, polypropylene terephthalate or polybutylene terephthalate.

The term "yarn" as used herein refers to a continuous strand of textile fibers, filaments or material in a form suitable for knitting, weaving, or otherwise intertwining to form a textile fabric. Yarn can occur in a variety of forms to include a spun yarn consisting of staple fibers usually bound together by twist; a multi filament yarn consisting of many continuous filaments or strands; or a mono filament yarn which consist of a single strand.

The term "air interlacing" as used herein refers to subjecting multiple strands of yarn to an air jet to combine the strands and thus form a single, intermittently commingled strand. This treatment is sometimes referred to as "air tacking." This term is not used to refer to the process of "intermingling" or "entangling" which is understood in the art to refer to a method of air compacting a multifilament yarn to facilitate its further processing, particularly in weaving processes. A yarn strand that has been intermingled typically is not combined with another yarn. Rather, the individual multifilament strands are entangled with each other within the confines of the single strand. This air compacting is used as a substitute for yarn sizing and as a means to provide improved pick resistance. This term also does not refer to well known air texturizing performed to increase the bulk of single yarn or multiple yarn strands. Methods of air interlacing in composite yarns and suitable apparatus therefore are described in U.S. Pat. Nos. 6,349,531; 6,341,483; and 6,212,914, the contents of which are hereby incorporated by reference.

The term "composite yarn" refers to a yarn prepared from two or more yarns, which can be the same or different. Composite yarn can occur in a variety of forms wherein the two or more yarns are in differing orientations relative to one another. The two or more yarns can, for example, be parallel, wrapped one around the other(s), twisted together, or combinations of any or all of these, as well as other orientations, depending on the properties of the composite yarn desired. Examples of such composite yarns are provided in U.S. Pat. Nos. 4,777,789; 5,177,948; 5,628,172; 5,845,476; 6,351,932; 6,363,703 and 6,367,290, the contents of which are hereby incorporated by reference.

In the present invention fire resistant composite yarn, the core comprises at least two metallic conductive strands. The metallic conductive strands can be made of any conductive metal, and preferably are of stainless steel or copper. Preferably, in order to provide sufficient flexibility of the metallic core, the metallic conductive strands should be of 40 or higher gauge metal, more preferably 42 or higher gauge, most preferably 44 or higher gauge. In some preferred embodiments, the core comprises at least 2 metallic strands, which are most preferably insulated one from the other with either a polyamide or polyurethane sheath (the metallic strands having such polymeric sheaths are commercially available). For uses above 150° C., the polyamide covered metallic strand is preferred. When a stainless steel wire is used in the core, the stainless steel wire is preferably of 0.5-4 mil in diameter, more preferably from 1-2 mil in diameter, most preferably 1.6 mil in diameter (0.0016 in). The core can optionally comprise other types of yarn, depending on the intended use. In certain embodiments, the core further comprises fiberglass to improve cut resistance, or can include high performance yarns, such as ultra-high molecular weight polyolefin (such as SPECTRA or DYNEEMA), or aramid yarns. When fiberglass is contained, the fiberglass can be of any weight/rating, including but not limited to those in the following Table 1:

TABLE 1

| Standard Fiberglass Sizes | |
|---|---|
| Fiberglass Size | Approximate Denier |
| G-450 | 99.21 |
| D-225 | 198.0 |
| G-150 | 297.6 |
| G-75 | 595.27 |
| G-50 | 892.90 |
| G-37 | 1206.62 |

The core may be of any desired denier, depending on the unit weight of yarn/sewing thread desired. Preferably, the core has a denier of from 50 to 1500, more preferably from 200 to 900.

The inner and outer cover yarns can be any type of yarn, including both natural and synthetic fibers, and are preferably a synthetic fiber including, but not limited to, polyester, nylon, rayon, cotton, acrylics, etc. In certain embodiments, it may be desirable for the inner cover yarn to be a high performance yarn or high tenacity yarn. Suitable high tenacity yarns include any of the high tenacity yarns having the very low or non-existent elongation, preferably at least one member selected from the group consisting of fiberglass, aramids, and ceramic fibers, most preferably fiberglass. Since this inner cover is helically applied, when subject to the bending stresses generated in the sewing operation, the helical configuration will allow some elongation of the inner cover (even in cases where the yarn used to prepare the inner cover has little to no elongation properties itself) to prevent damage or breakage, particularly in a preferred fiberglass embodiment. The inner cover is wrapped around the core at a rate of turns per inch sufficient to provide coverage of the core, and varies depending on the denier and diameter of the core, as well as the denier of the yarn making up the inner cover. Preferably, the inner cover is wrapped at a rate of from 4 to 15 tpi, more preferably from 6 to 12 tpi. The inner cover yarn may have any desired denier, again depending on the desired size of the final product yarn. Preferably, the inner cover has a denier from 50 to 1500, most preferably from 100 to 1000.

The outer cover may be made of any desired fiber, including both natural and synthetic fibers, and is preferably a synthetic fiber including, but not limited to, polyester or nylon. Like the inner cover, the outer cover may be any desired denier, depending on the final size of the resulting yarn product and is preferably from 50 to 1500 denier, most preferably from 100 to 1000 denier. The outer cover is then wrapped at a rate sufficient to provide complete coverage of the inner cover, preferably from 4 to 15 tpi, more preferably from 6 to 12 tpi, again depending upon the composite denier of the core/inner cover combination and the denier of the yarn making up the outer cover. The outer cover preferably protects the core and inner cover.

In a fire resistant embodiment of the present invention, the fire resistant sewing thread described in U.S. Pat. No. 7,111,445, the contents of which are hereby incorporated by reference in their entirety, can be used, with the metallic strands of the present invention added to the core. In such preferred embodiments, if the sewn product is present in a fire, the inner cover will remain intact and maintain the fabric sections together, even though the core may melt.

The resulting composite yarn can have any desired composite denier, and preferably has a measured composite denier of from 300 to 2000, more preferably from 500 to 1500, most preferably from 1000 to 1400. While this is the measured composite denier, the resulting yarn has a size comparable to a typical composite denier of a non-metallic containing composite yarn of 150 to 1000, more preferably from 350 to 750, most preferably from 500 to 600. The reason for the much higher measured composite denier is the higher density (and thus higher weight per unit volume) of the metallic strands in the core.

Once the composite yarn is formed, it is subjected to a finishing operation in which at least one bonding agent and, optionally, at least one lubricant is applied. These can be applied in any conventional manner, including but not limited to spraying on the fiber, application by kiss-roll, or dipping the yarn into a bath containing the bonding agent or lubricant, either neat or as a solution in a suitable organic or aqueous solvent. The preferred lubricant is a silicone with paraffin added. Additional lubricants which have been found to be satisfactory are RAYOLAN 1813, Boehme FILATEX, or KL 400 (Kelmar). When the composite yarn is a composite sewing thread, the composite yarn is lubricated so that the sewing thread can withstand the heat of the needle as it repeatedly slides through the needle eye during the sewing operation.

The composite yarn is treated with at least one suitable bonding agent, including but not limited to at least one member selected from the group consisting of polyurethanes, polyacrylics, nylons and other conventional fiber bonding compositions. The bonding can be applied to the assembled core, to the inner cover, or to the outside of the fully assembled composite yarn. Preferably, the bonding is applied to the outside of the fully assembled composite yarn. Once applied, the bonding agent is permitted to dry or cure to provide sufficient bonding of the yarn fibers.

The present invention encompasses various embodiments of conductive yarns/sewing threads, including but not limited to:

- Conductive yarns/sewing threads having 3, 4 or more metallic strands in the core to provide additional high levels of conductivity; these higher levels of metallic strands typically must be balanced with flexibility requirements in order to provide a yarn/sewing thread that can still be sewn, knit or woven; in such embodiments, each of the 3, 4 or more metallic strands comprises a core metallic strand of 40 gauge or higher, and a second metallic strand of 40 gauge or higher wrapped around the core metallic strand at a wrap rate of 1 to 50 tpi;

Conductive yarns having differing bonding agents, such as polyurethanes or polyamides, depending on the properties sought;

Conductive reflective yarns/sewing threads, wherein the reflective properties are provided, for example, by embedding retroflective beads (in the range of microns or smaller in diameter) in the surface of the yarn/sewing thread;

Conductive luminescent yarns/sewing threads, in which a photoluminescent yarn is used as at least a part of the outer cover;

Conductive yarns/sewing threads which are particularly useful for transmission of electrical signals and data, while minimizing crosstalk interference, of both inductive and capacitive types;

Conductive yarns/sewing threads that can be soldered without requiring stripping of the insulation layer, and still making durable and cohesive connections;

Conductive yarns/sewing threads that can be readily used as a passive antenna for receiving electromagnetic signals;

Conductive yarns/sewing threads of the present invention can be used to prepare capacitors;

Conductive yarns/sewing threads of the present invention can be sewn into various types of garments to prepare “smart garments” which permit transmission of data signals from various sensors either on the garment or on the wearer, to permit tracking and monitoring of a variety of parameters, including biological/health parameters of the wearer, geospatial position of the wearer, etc; the resulting smart garment can be used to monitor personnel location and condition in the field if desired, and permit transmission of other desired parameters either to remote locations or to localized data storage on the wearer for later analysis;

Conductive yarns/sewing threads of the present invention provide minimized (or even completed eliminated) crosstalk, avoiding capacitive and inductive interference between yarns/sewing threads, thus permitting better signal transmission along the conductive yarns/sewing threads;

Conductive yarns/sewing threads of the present invention are capable of previously unattainable high levels of conductivity on the order of 1.9 Ohms per meter, containing preferably up to four wires, and are suitable for use with commercial sewing machines; they can be woven or knitted into fabrics that heat, control switches and volume, interact with wireless technology and that can become sensors for impact and touch;

Conductive yarns/sewing threads of the present invention can be used to retrofit body armor with conductive smart yarns into impact sensors, or can be incorporated along with a Bluetooth transmitter, such that critical information can be transmitted instantly if the wearer is incapacitated and down;

Conductive yarns/sewing threads of the present invention can actually perform as sensors in smart fabrics, permitting transmission of data signals for any desired parameters, including vital stats for the wearer, GPS location data, current positional condition (prone or standing), etc. thus enabling a wide variety of smart fabric capabilities;

Magnetic conductive yarns/sewing threads, in which an additional magnetic metallic strand (such as a strand of nickel wire having low conductivity but high magnetization properties) is included within the core;

Color coded conductive yarns/sewing threads, in which the various metallic strands present in the core are each coated with differing color polymeric coatings for ease of identification; and Antimicrobial conductive yarns/sewing threads, in which the conductive yarns/sewing threads of the present invention are made antimicrobial through treatment with an antimicrobial composition, such as that set forth in U.S. Pat. No. 7,939,686, the entire contents of which are hereby incorporated by reference in their entirety.

For purposes of illustration, several examples of the composite conductive yarn/sewing thread of the present invention are set forth below:

Example 1

Core: two 44 ga copper wires, one wrapped around the other at a wrap rate of approximately 25 tpi, each having a polyurethane coating
Inner cover: 70 denier polyester (PET)
Outer cover: 70 denier polyester (PET)
Bonding agent: polyurethane

Example 2

Core: two 44 ga copper wires, one wrapped around the other at a wrap rate of approximately 30 tpi, each having a polyurethane coating
Inner cover: 100 denier polyester (PET)
Outer cover: 100 denier polyester (PET)
Bonding agent: polyamide

Example 3

Core: two 40 ga copper wires, each individually wrapped with an additional 40 ga copper wire at a wrap rate of approximately 20 tpi, each having a polyamide coating
Inner cover: 250 denier polyester (PET)
Outer cover: 250 denier polyester (PET)
Bonding agent: polyurethane

Example 4

Core: four 44 ga copper wires, each individually wrapped with an additional 40 ga copper wire at a wrap rate of approximately 18 tpi, each having a polyurethane coating
Inner cover: 70 denier Nylon (nylon 6,6)
Outer cover: 70 denier polyester (PET)
Bonding agent: polyurethane

Example 5

Core: two 44 ga copper wires, each individually wrapped with an additional 44 ga copper wire at a wrap rate of approximately 24 tpi, each having a polyamide coating, 100 denier SPECTRA
Inner cover: 70 denier polyester (PET)
Outer cover: 70 denier polyester (PET)
Bonding agent: polyurethane

Example 6

Core: two 44 ga copper wires, each individually wrapped with an additional 44 ga copper wire at a wrap rate of approximately 15 tpi, each having a polyamide coating, G-450 fiberglass Inner cover: 70 denier polyester (PET)
Outer cover: 70 denier polyester (PET)
Bonding agent: polyurethane A preferred embodiment of the conductive composite sewing thread of the present invention is a conductive composite sewing thread/yarn, having 2 metallic strands in the core, preferably from 44 gauge copper wire, with each metallic strand being individually wrapped with a further 44 gauge copper wire at a wrap rate of from 15-25 tpi. When such a conductive sewn thread is sewn using a standard bobbin type sewing machine, the resulting stitch provides a 4 lead system, thus having capability to provide a power lead, a ground lead and 2 signal leads. Such a system can be used to sew in conductive patterns into a fabric or garment, permitting the connection of various biometric measuring devices, or other electrical connections providing signal and data transmission capability. The resulting signal transmission and data transmission can be performed with crosstalk measurements of 20 dB or less.

In a further embodiment of the present invention, the conductive composite sewing thread has a core formed of two 44 gauge copper wires, each wrapped with a further 40 gauge copper wire at a wrap rate of 20-30 tpi, and one 1.6 mil stainless steel wire, which provides additional strength to the sewing thread such that it can be sewn using commercial grade sewing machines, while still maintaining the desired electrical conductivity and signal transmission properties.

The conductive sewing thread of the present invention can be used to turn any desired fabric or garment into a "smart fabric" or "smart garment". In the context of the present invention, the terms "smart fabric" and "smart garment" are meant to indicate that a conductive pattern or grid, or at least conductive segments, have been sewn into the fabric or garment, thus permitting the attachment of electrical leads to the conductive segments/pattern/grid, and enabling the use of the garment to be used for a variety of monitoring or tracking purposes common to such garments. A primary difference with such fabrics or garments made using the present invention is that custom patterns or grids can be readily applied to the garment using a standard sewing machine, without worrying about the yarn crossing itself and causing a short circuit or other electrical fault to occur.

Because of the reduced crosstalk engendered by the present invention conductive yarns/sewing threads, it is possible to wire a garment with multiple sensors and communication lines and connections via the conductive yarns/sewing threads, and thus to transmit multiple signals simultaneously without crosstalk interference between lines. This permits real-time monitoring of multiple parameters associated with the garment and wearer as desired.

In the garment of the present invention, one or more devices are incorporated to provide satellite position tracking information and/or accelerometer data regarding the wearer. The position tracking and accelerometer data can be provided by separate devices or by a single device having both capabilities. Any commercially available satellite positioning device and/or accelerometer device can be used, with a preferred device being the SCOUT Personal GPS device offered by BluAzu, LLC of Gainesville, FL. The SCOUT Personal GPST device is a small, lightweight, and portable GPS tracker that combines a Global Positioning Satellite tracker with an accelerometer to detect movement and changes in movement. The SCOUT Personal GPS communicates through Bluetooth, GPS, and cellular networks, and provides vibration sensing and an accelerometer in a single device. This preferred device can be readily incorporated into the garment, and can provide speed, direction of travel, impact detection, and an array of customizable notification settings. The device(s) operate in both indoor and outdoor environments and the signals are preferably transmitted through the wearer's smartphone, tablet, or similar device via an embedded cellular radio connected to a nationwide network. Alternatively, in a separate embodiment, the satellite positioning/accelerometer device can communicate through communication through the satellite network, similar to a satellite phone. The satellite positioning capability is provided through accessing a plurality of global positioning satellites, preferably 3 satellites, most preferably 4 satellites, and providing position data through triangulation using the plurality of global positioning satellites.

In a most preferred embodiment of the garment of the present invention, the satellite positioning/accelerometer device(s) are programmed to detect desired changes in the status of the wearer, then communicate through cellular networks to send an alert to a desired party providing information regarding the change in status, and the position of the wearer. Examples of situations where this can be used include, but are not limited to:

If a first responder (police/fire/EMS) is in a vehicle accident;

If a first responder (police/fire/EMS) is struck by a vehicle;

If a first responder (police/fire/EMS) is shot or otherwise injured/incapacitated;

If a first responder (police/fire/EMS) is unconscious and not moving;

If a first responder (police/fire/EMS) is injured and can not speak, but is slowly mobile, such as crawling around.

The garment of the present invention equipped with the satellite positioning/accelerometer device can detect small movements, and can be used to measure sudden stops. In the event of sudden stops (such as in a car accident or other sudden event), the unit can be readily programmed that upon any stop with greater than a desired amount of joules of energy (or newtons of force), an alert is triggered, and a signal sent to the base or station of the wearer to notify of a potential hazardous event, and provide the location of the wearer. Further, the device can be programmed such that if the wearer is not moving for a preset period of time (such as, for example, 15 seconds), the alert is triggered. The device can additionally (or alternatively) be programmed to send an alert if the wearer (such as a police officer) is chasing a criminal and exceeds the speed limit, or a preprogrammed maximum speed. For example, if the police officer exceeds 85 MPH, an alert can be triggered sending the location to the Police headquarters to rapidly notify the dispatcher of a high speed chase and its precise location, while permitting the police officer to focus on the tasks of driving at such high speeds and apprehending the criminal.

In a preferred embodiment, the positioning/accelerometer device(s) has a gyroscope function as well, and is adjusted for a baseline reading, to determine vertical, thus allowing the detection of an "officer down" type situation wherein the wearer has been shot or otherwise injured and is in a prone position for a set period of time. By programming the device(s) to trigger at a set time period under a set of specified conditions, the instances of false triggers can be drastically reduced.

When an alert is triggered under any of the desired and preprogrammed triggers, the GPS position of the wearer is sent via the mobile app, the website, or by SMS (text message) to any preprogrammed number. The location data can be sent in any desired format, preferably using GPS coordinates for more accurate location of the wearer.

In a further embodiment of the garment of the present invention, the satellite positioning/accelerometer device can be programmed to send out an alert to multiple parties. For example, in a situation where the wearer is a first responder at a location on a call, and the wearer suffers a defined event (officer down, medical emergency such as a heart attack, etc), the alert can be programmed to go out to all first responders within a defined distance to provide the location of the wearer in distress, for prompt action by the others in the area.

In a further preferred embodiment, the garment can additionally incorporate a heart rate monitor or other biometric monitors, alone or in desired combinations. This preferred garment would enable monitoring of the physical condition of the wearer, such that upon a triggering event (such as a heart attack, stroke, heat exhaustion, etc), the alert signal can go out to alert others that the wearer is in distress.

In still another preferred embodiment, the satellite positioning/accelerometer device can be made waterproof (by encasing it within a waterproof cover for example), for use by wearers involved in water rescue, such as firefighters/EMS and Coast Guard members. In the case where an event occurs (such as a boat in distress), the wearer can press an activator, or pull a "rip cord" (or other manual activator) to activate the device, thus signaling the location of the wearer. In an alternative embodiment of this aspect of the present invention, the garment can be a personal flotation device (PFD), with the satellite positioning/accelerometer device being incorporated into the PFD.

In a further preferred embodiment, the accelerometer portion of the device can be sensitive enough to measure if the wearer discharges a weapon, then report out that a shot has been fired. In an additional embodiment, the satellite location/accelerometer device is equipped with a microphone to measure sudden changes in decibel level, and discriminate to identify gunshots fired within a defined distance of the wearer. This embodiment would permit immediate notification to a central location that a shot has been fired, whether from the wearer (such as a police officer or soldier) or from someone near the wearer (such as a fellow officer or soldier, or a criminal/enemy combatant). This would permit the central location to mobilize assistance more quickly, without the need for the wearer to affirmatively contact the central location through radio.

In one embodiment of the present invention, the composite conductive yarn/sewing thread can be incorporated into the garment in such a manner as to act as an antenna, thus boosting the range and/or signal of the one or more positioning/accelerometer device(s), and/or boosting the range and/or signal of the optional one or more signal transmitters, thus increasing the capability of the smart garment of the present invention.

In still another embodiment, it has been found that GPS signals penetrate through snow better than a conventional avalanche beacon. In that situation, the present invention garment can provide better location ability to those trapped under snowbanks in an avalanche. In a preferred version of this embodiment, the satellite positioning/accelerometer device(s) of the present invention can be further equipped with an external antenna, attached to the device(s) through a port, such as a micro-USB connection port. This increases the signal capability of the unit providing for better location performance. In a still further embodiment, this antenna can actually be the composite conductive yarn/sewing thread of the present invention garment, such that the garment itself acts as the antenna, as described above.

The present invention, by accessing 3 or more global positioning satellites, can further provide signaling as to the elevation of the wearer, such as what particular floor of a multistory building the wearer is or how far under the surface of an avalanche the wearer is. This provide even greater location capabilities providing for quicker response to life threatening situations.

In a further embodiment, the satellite location/accelerometer device(s) can connect to other sensors (such as heart rate monitors or other biometric measuring sensors) through Bluetooth connection, reducing the hardwire connections necessary.

Through the use of these garments of the present invention, the wearer (particularly first responders such as police officers and firefighters) can have their condition and location monitored in real time, in order to provide assistance in shorter periods upon the occurrence of an injury or life threatening event. The garment of the present invention can be any desired type of garment, including, but not limited to, shirts, jackets, sweaters, pants, socks, coats, hats, helmets, or even undergarments.

In a further embodiment of the garment of the present invention, the garment includes one or more lights, which may be single lights or light bars comprising a plurality of light sources. These one or more lights are preferably LED lights, and preferably are lightweight strips of LED lights which can be arranged in any desired pattern on the garment. The one or more lights can be conductively coupled to the positioning/accelerometer device(s) and programmed to trigger (i.e. light up) upon changes in acceleration. The lights can be white in color, or can be any desired color (using either a combination of RGB LED's, or other types of programmable colored lights).

In a further embodiment, the lights can be equipped with a photodiode for the detection of approaching objects, such as vehicles, upon which the lights can be triggered in order to increase visibility of the wearer to the approaching vehicle. The lights can also be programmed to change color upon approach of an oncoming vehicle, or upon the wearer's approach to a lighted source (such as headlights). The lights can further be programmed to change their blinking rate (either increasing or decreasing) based upon relative distance to an object, such as a stationary or moving vehicle.

The following are exemplary embodiments of the present disclosure:

Embodiment 1

A garment prepared from a smart fabric, wherein the smart fabric comprises:

one or more devices providing satellite positioning measurement, accelerometer measurement, or both, conductively coupled to a battery or other DC power source.

Embodiment 2

The garment of Embodiment 1, wherein the smart fabric further comprises:

a conductive composite yarn/sewing thread conductively coupled to the one or more devices providing satellite positioning measurement, accelerometer measurement, or both, wherein the conductive composite yarn/sewing thread comprises:

a) a core formed of at least two strands of a conductive metal of 40 or higher gauge, wherein the at least two strands of conductive metal are configured such that one strand is wrapped around the other strand at a wrap rate of from 1 to 50 turns per inch (tpi); wherein the wrapped strand is preferably a ground wire, and
b) at least one inner cover wrapped around the core in a first direction at a rate sufficient to provide substantially complete coverage of the core by the inner cover;
c) at least one outer cover wrapped around the at least one inner cover, wherein the outer cover is wrapped in a second direction opposite to a direction of a cover layer on which the outer cover is directly wrapped, at a rate sufficient to provide substantially complete cover of the cover layer on which the outer cover is directly wrapped; and
d) at least one bonding agent; and
e) optionally, a lubricant.

Embodiment 3

The garment of Embodiments 1 or 2, further comprising one or more signal transmitters conductively coupled to the one or more devices, wherein the one or more signal transmitters are capable of sending data through one or both of a mobile telephone network or a satellite communications network.

Embodiment 4

The garment of one of Embodiments 1 to 3, wherein the one or more devices further comprise one or more signal transmitters, wherein the one or more signal transmitters are capable of sending data through one or both of a mobile telephone network or a satellite communications network.

Embodiment 5

The garment of one of Embodiments 2 to 4, further comprising one or more signal transmitters conductively coupled to the one or more devices, wherein the one or more signal transmitters are capable of sending data through one or both of a mobile telephone network or a satellite communications network.

Embodiment 6

The garment of one of Embodiments 2 to 5, wherein the one or more devices further comprise one or more signal transmitters, wherein the one or more signal transmitters are capable of sending data through one or both of a mobile telephone network or a satellite communications network.

Embodiment 7

The garment of one of Embodiments 1 to 6, wherein the one or more devices further comprise a gyroscope to detect changes in vertical orientation of the wearer.

Embodiment 8

The garment of one of Embodiments 1 to 7, wherein said core comprises two or more strands of an electrically conductive metal of 40 or higher gauge, each individually wrapped by a further strand of electrically conductive metal of 40 or higher gauge at a wrap rate of from 1 to 50 turns per inch.

Embodiment 9

The garment of one of Embodiments 1 to 8, wherein said electrically conductive metal is copper.

Embodiment 10

The garment of Embodiment 9, wherein the at least two copper wire strands are 42 gauge copper wires.

Embodiment 11

The garment of Embodiment 10, wherein the at least two copper wire strands are 44 gauge copper wires.

Embodiment 12

The garment of one of Embodiments 1 to 9, wherein said core comprises two 40 or higher gauge copper wires, each individually wrapped by a further strand of electrically conductive metal of 40 or higher gauge at a wrap rate of from 1 to 50 turns per inch.

Embodiment 13

The garment of Embodiment 12, wherein the two copper wires and the further strands of electrically conductive metal are each of 44 gauge.

Embodiment 14

The garment of one of Embodiments 1 to 13, wherein said core further comprises a stainless steel wire having a diameter of 1-2 mil.

Embodiment 15

The garment of one of Embodiments 1 to 14, wherein said outer cover is formed of at least one strand of a yarn selected from the group consisting of nylon and polyester yarns.

Embodiment 16

The garment according to one of Embodiments 1 to 15, wherein said core further comprises fiberglass having a denier of from 100 to 300.

Embodiment 17

The garment according to one of Embodiments 1 to 16, wherein the conductive composite yarn is a conductive composite sewing thread.

Embodiment 18

The garment according to one of Embodiments 1 to 17, wherein the yarn has a composite denier of from 400 to 700.

Embodiment 19

The garment according to one of Embodiments 1 to 18, wherein the yarn has a composite denier of from 500 to 600.

Embodiment 20

The garment according to one of Embodiments 1 to 19, wherein the lubricant is a composition comprising silicone and paraffin.

Embodiment 21

The garment according to one of Embodiments 1 to 20, wherein the one metallic strand wrapped around the other metallic strand is connected to ground during use.

Embodiment 22

The garment according to one of Embodiments 1 to 21, wherein the garment is selected from the group consisting of shirts, jackets, sweaters, pants, socks, coats, hats, helmets, and undergarments.

Embodiment 23

The garment according to one of Embodiments 1 to 22, wherein the garment is a personal flotation device, and the one or more devices are enclosed within a waterproof container.

Embodiment 24

The garment of one of Embodiments 1 to 23, further comprising one or more lights conductively coupled to the one or more devices.

Embodiment 25

The garment of Embodiment 24, further comprising a photodiode conductively coupled to the one or more lights, in order to detect approaching objects and trigger the one or more lights.

Embodiment 26

The garment of one of Embodiments 5 to 25, wherein the composite conductive yarn/sewing thread is conductively coupled to the one or more devices providing satellite positioning measurement, accelerometer measurement, or both in a configuration to act as an antenna for improving reception and increasing signaling.

While certain preferred embodiments have been described in detail here and above, it is apparent that various changes may be made without departing from the scope of the invention. For example, as stated here and above, the conductive composite yarn/sewing thread may include multiple strands in the core, multiple strands in the inner cover, and/or multiple strands in the outer cover.

The invention claimed is:

1. A garment prepared from a smart fabric, wherein the smart fabric comprises:

one or more devices providing satellite positioning measurement, accelerometer measurement, or both, conductively coupled to a battery or other DC power source; and a conductive composite yarn conductively coupled to the one or more devices providing satellite positioning measurement, accelerometer measurement, or both, wherein the conductive composite yarn comprises:

a) a core formed of at least two strands of a conductive metal of 40 or higher gauge, wherein the at least two strands of conductive metal are configured such that one strand is wrapped around the other strand at a wrap rate of from 1 to 50 turns per inch (tpi); and b) at least one inner cover wrapped around the core in a first direction at a rate sufficient to provide substantially complete coverage of the core by the inner cover;

c) at least one outer cover wrapped around the at least one inner cover, wherein the outer cover is wrapped in a second direction opposite to a direction of a cover layer on which the outer cover is directly wrapped, at a rate sufficient to provide substantially complete cover of the cover layer on which the outer cover is directly wrapped; and d) at least one bonding agent.

2. The garment of claim 1, wherein the smart fabric further comprises a lubricant.

3. The garment of claim 1, further comprising one or more signal transmitters conductively coupled to the one or more devices, wherein the one or more signal transmitters are capable of sending data through one or both of a mobile telephone network or a satellite communications network.

4. The garment of claim 1, wherein the one or more devices further comprise one or more signal transmitters, wherein the one or more signal transmitters are capable of sending data through one or both of a mobile telephone network or a satellite communications network.

5. The garment of claim 1, further comprising one or more signal transmitters conductively coupled to the one or more devices, wherein the one or more signal transmitters are capable of sending data through one or both of a mobile telephone network or a satellite communications network.

6. The garment of claim 3, wherein the one or more devices further comprise one or more signal transmitters, wherein the one or more signal transmitters are capable of sending data through one or both of a mobile telephone network or a satellite communications network.

7. The garment of claim 1, wherein the one or more devices further comprise a gyroscope to detect changes in vertical orientation of the wearer.

8. The garment of claim 1, wherein said core comprises two or more strands of an electrically conductive metal of 40 or higher gauge, each individually wrapped by a further strand of electrically conductive metal of 40 or higher gauge at a wrap rate of from 1 to 50 turns per inch.

9. The garment of claim 1, wherein said electrically conductive metal is copper.

10. The garment of claim 9, wherein the at least two copper wire strands are 42 gauge copper wires.

11. The garment of claim 10, wherein the at least two copper wire strands are 44 gauge copper wires.

12. The garment of claim 9, wherein said core comprises two 40 or higher gauge copper wires, each individually wrapped by a further strand of electrically conductive metal of 40 or higher gauge at a wrap rate of from 1 to 50 turns per inch.

13. The garment of claim 12, wherein the two copper wires and the further strands of electrically conductive metal are each of 44 gauge.

14. The garment of claim 13, wherein said core further comprises a stainless steel wire having a diameter of 1-2 mil.

15. The garment of claim 1, wherein said outer cover is formed of at least one strand of a yarn selected from the group consisting of nylon and polyester yarns.

16. The garment according to claim 1, wherein said core further comprises fiberglass having a denier of from 100 to 300.

17. The garment according to claim 1, wherein the conductive composite yarn is a conductive composite sewing thread.

18. The garment according to claim 1, wherein the yarn has a composite denier of from 400 to 700.

19. The garment according to claim 1, wherein the yarn has a composite denier of from 500 to 600.

20. The garment according to claim 2, wherein the lubricant is a composition comprising silicone and paraffin.

21. The garment according to claim 1, wherein the one metallic strand wrapped around the other metallic strand is connected to ground during use.

22. The garment according to claim 1, wherein the garment is selected from the group consisting of shirts, jackets, sweaters, pants, socks, coats, hats, helmets, and undergarments.

23. The garment according to claim 1, wherein the garment is a personal flotation device, and the one or more devices are enclosed within a waterproof container.

24. The garment of claim 1, further comprising one or more lights conductively coupled to the one or more devices.

25. The garment of claim 24, further comprising a photodiode conductively coupled to the one or more lights, in order to detect approaching objects and trigger the one or more lights.

26. The garment of claim 5, wherein the composite conductive yarn is conductively coupled to the one or more devices providing satellite positioning measurement, accelerometer measurement, or both in a configuration to act as an antenna for improving reception and increasing signaling.

27. The garment of claim 6, wherein the composite conductive yarn is conductively coupled to the one or more devices providing satellite positioning measurement, accelerometer measurement, or both in a configuration to act as an antenna for improving reception and increasing signaling.

* * * * *